United States Patent
Jung et al.

(10) Patent No.: US 11,818,490 B2
(45) Date of Patent: Nov. 14, 2023

(54) VIDEO TRANSMITTING DEVICE AND VIDEO RECEIVING DEVICE

(71) Applicant: LG ELECTRONICS INC., Seoul (KR)

(72) Inventors: Sungbo Jung, Seoul (KR); Dongsung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 280 days.

(21) Appl. No.: 17/284,194

(22) PCT Filed: Dec. 20, 2018

(86) PCT No.: PCT/KR2018/016358
§ 371 (c)(1),
(2) Date: Apr. 9, 2021

(87) PCT Pub. No.: WO2020/130195
PCT Pub. Date: Jun. 25, 2020

(65) Prior Publication Data
US 2021/0360127 A1    Nov. 18, 2021

(51) Int. Cl.
*H04N 5/067* (2006.01)
*H04N 19/136* (2014.01)
*H04N 19/15* (2014.01)
*H04N 21/2385* (2011.01)
*H04N 21/845* (2011.01)

(52) U.S. Cl.
CPC .......... *H04N 5/067* (2013.01); *H04N 19/136* (2014.11); *H04N 19/15* (2014.11); *H04N 21/2385* (2013.01); *H04N 21/8456* (2013.01)

(58) Field of Classification Search
CPC .......... H04N 5/067; H04N 5/136; H04N 5/15; H04N 5/2385; H04N 5/8456
See application file for complete search history.

(56) References Cited

U.S. PATENT DOCUMENTS

| 8,856,840 | B2 | 10/2014 | Nakajima |
| 2005/0283809 | A1 | 12/2005 | Kim |
| 2010/0073574 | A1 | 3/2010 | Nakajima et al. |
| 2010/0303146 | A1 | 12/2010 | Kamay |
| 2015/0326635 | A1 | 11/2015 | Yarygin |

FOREIGN PATENT DOCUMENTS

KR    1020080100125    11/2008

OTHER PUBLICATIONS

PCT International Application No. PCT/KR2018/016358, International Search Report dated Sep. 19, 2019, 3 pages.

*Primary Examiner* — On S Mung
(74) *Attorney, Agent, or Firm* — LEE, HONG, DEGERMAN, KANG & WAIMEY PC

(57) ABSTRACT

A video transmitting device includes a first wireless transmitting unit and a second wireless transmitting unit, and includes a wireless transmitting unit to wirelessly make communication with a video receiving device, a content compressing unit configured to compress an Audio-Video (AV) signal, and a processor to transmit the compressed AV signal in a first frequency band to the video receiving device through the first wireless transmitting unit and configured to transmit an uncompressed control signal, which contains information on the AV signal in a second frequency band lower than the first frequency band, to the video receiving device through the second wireless transmitting unit.

15 Claims, 7 Drawing Sheets

[Figure 1]
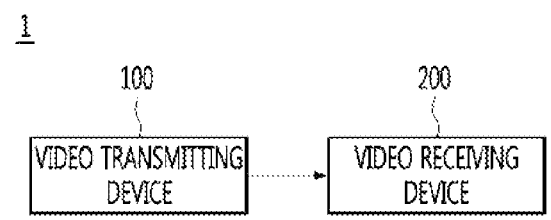

[Figure 2]
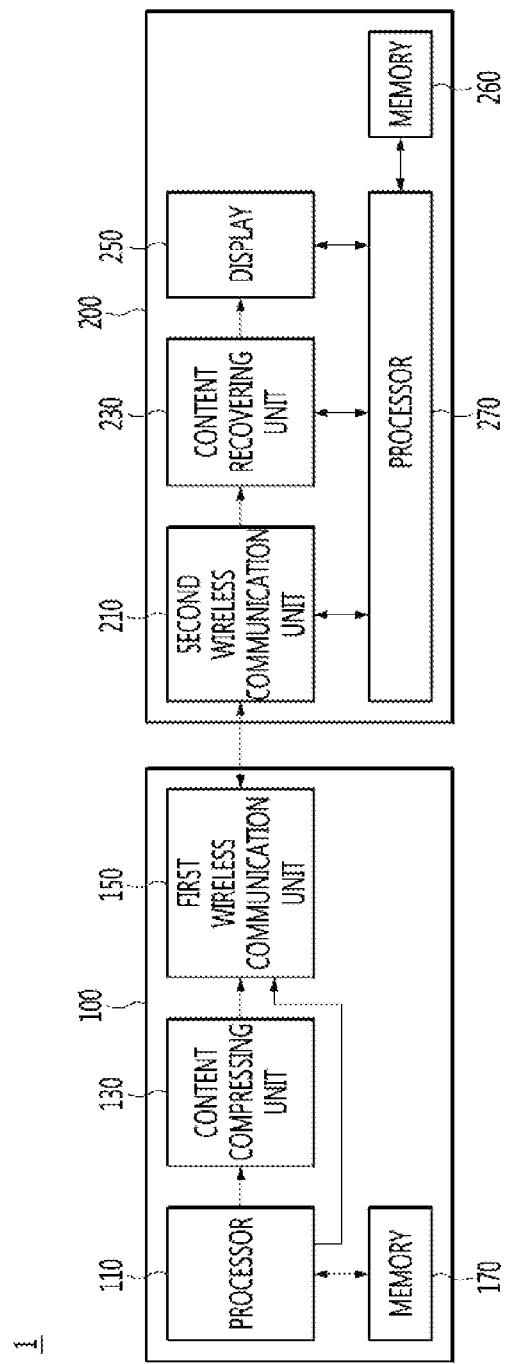

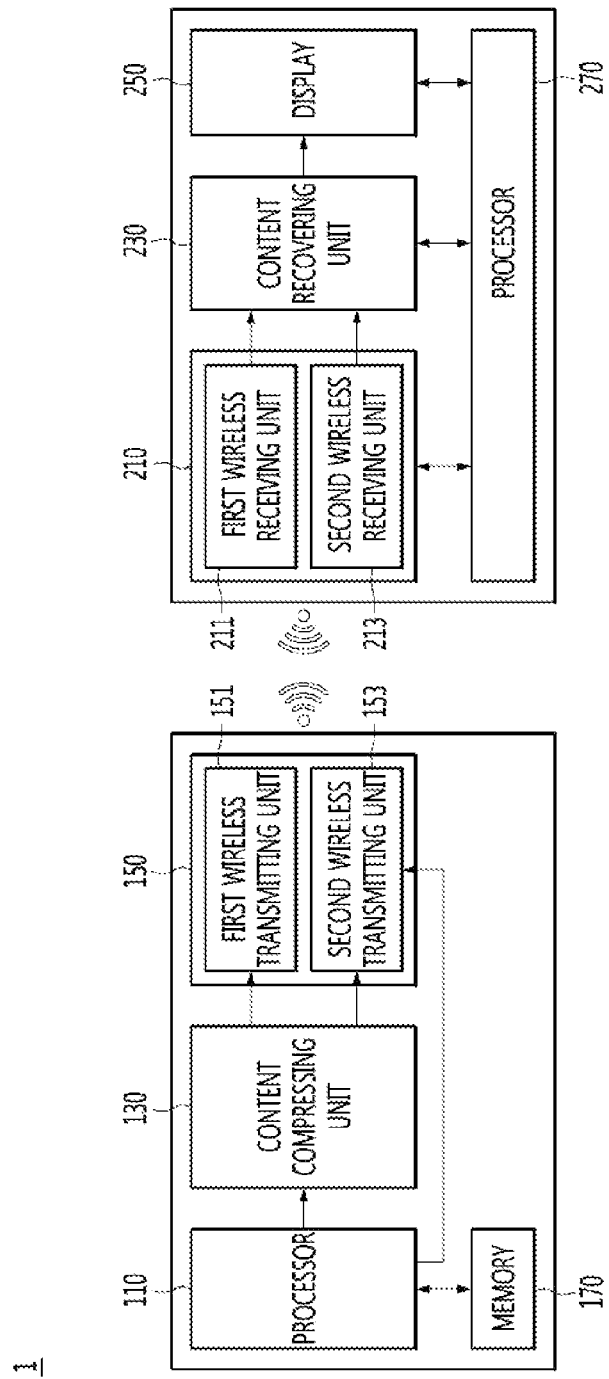
[Figure 3]

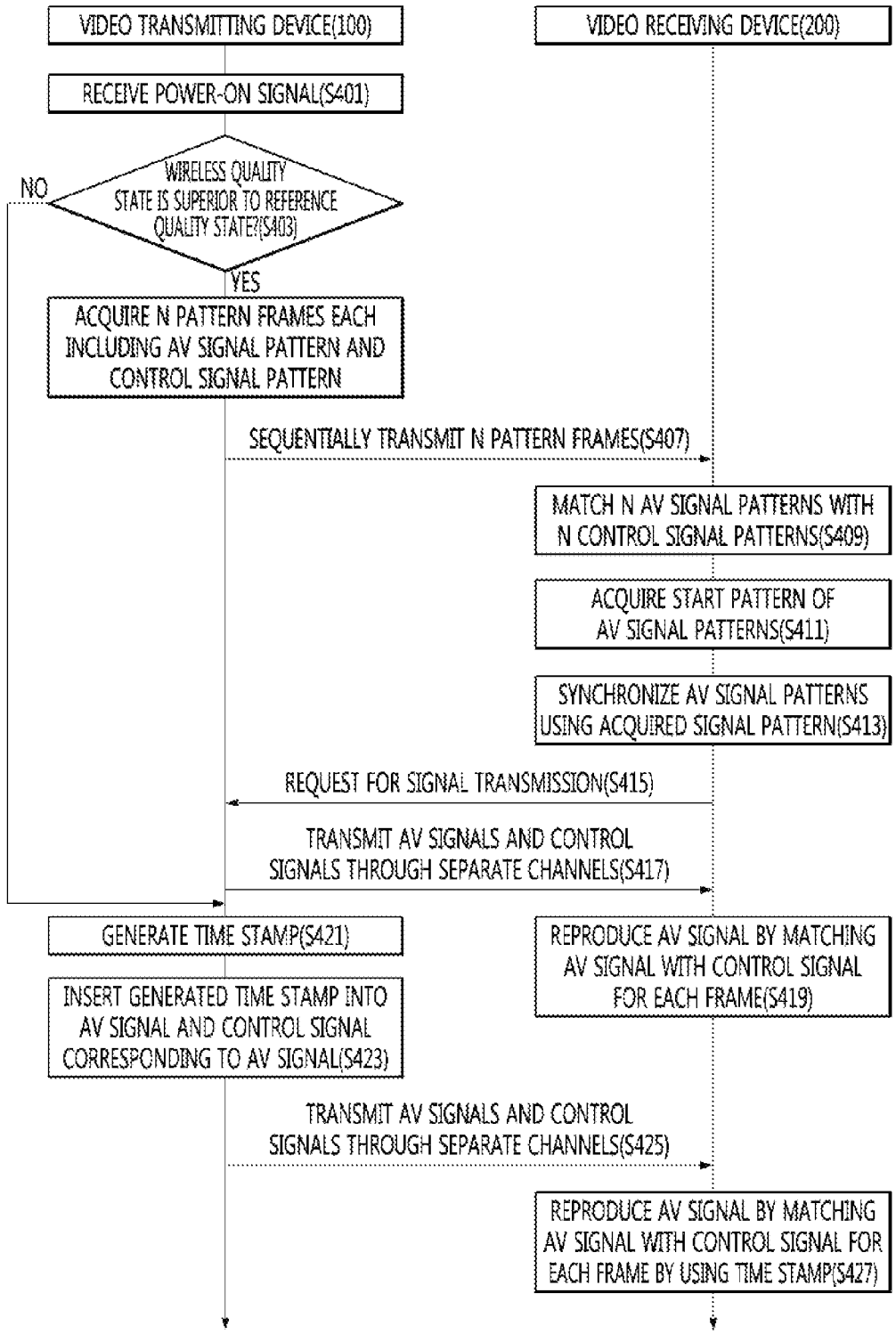

[Figure 5]
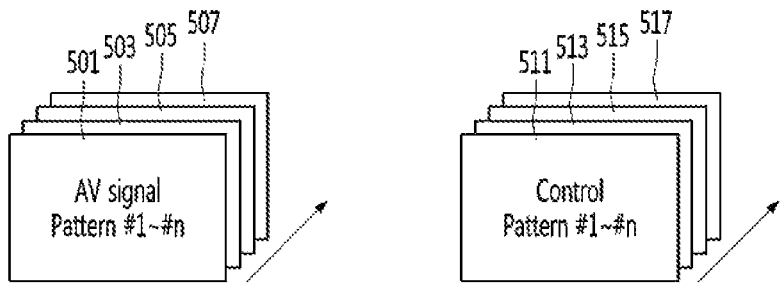
[Figure 6]
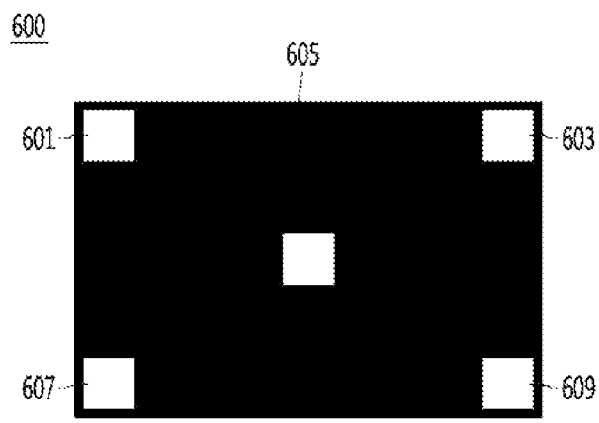
[Figure 7]
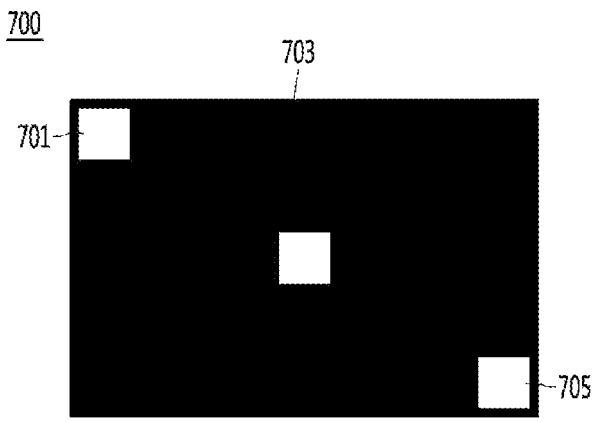

【Figure 8】
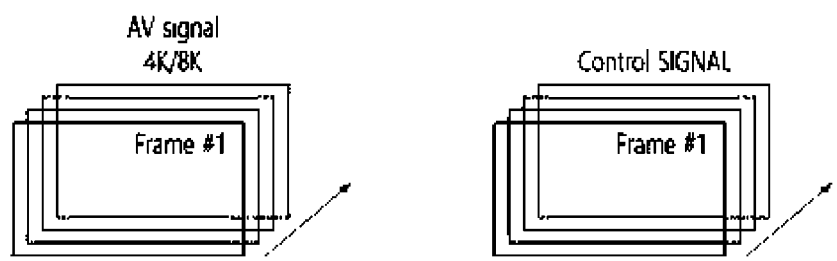
【Figure 9】
|  | AV signal | Control signal |
|---|---|---|
| DATA AMOUNT | LARGE | SMALL |
| COMPRESSION STATE | COMPRESSED | UNCOMPRESSED |
| LOSS | PARTIAL LOSS | LOSSLESS |
| WIRELESS TRANSMISSION PERIOD | random | random |

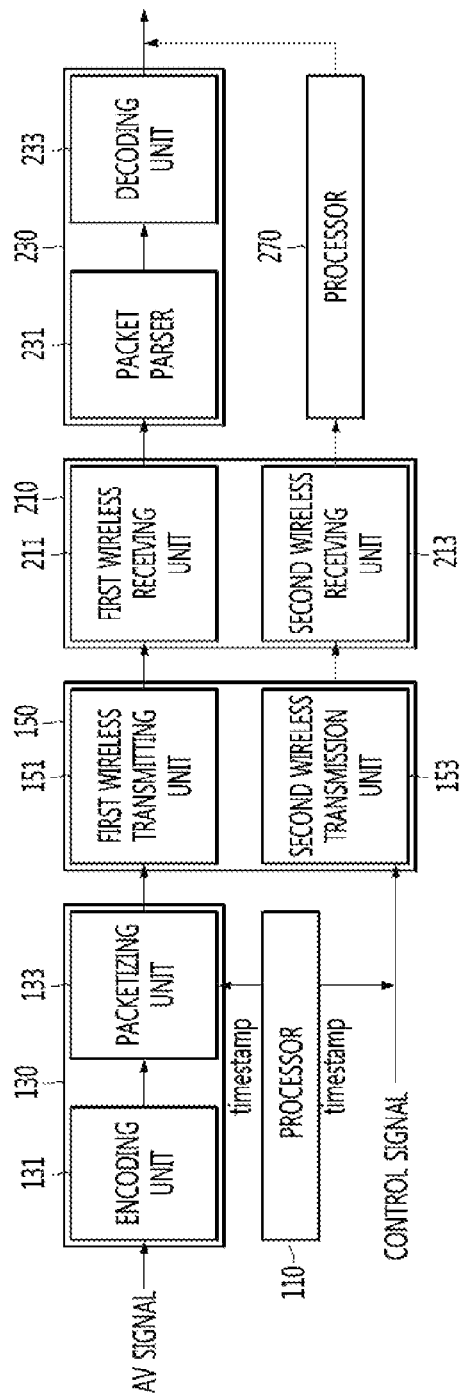
[Figure 10]

VIDEO TRANSMITTING DEVICE AND VIDEO RECEIVING DEVICE

CROSS-REFERENCE TO RELATED APPLICATIONS

This application is the National Stage filing under 35 U.S.C. 371 of International Application No. PCT/KR2018/016358, filed on Dec. 20, 2018, the contents of which is incorporated by reference herein in its entirety.

TECHNICAL FIELD

The present invention relates to a video transmitting device capable of compressing and transmitting a video.

BACKGROUND ART

As a video technology has changed from an analog scheme to a digital scheme, the video technology has been developed from Standard-Definition (SD) to Hi-Definition (HD) in order to provide images closer to actual images. The SD supports 704×480 resolution and includes about 350,000 pixels. The HD is divided into HD and Full HD. The Full HD for supporting higher resolution supports 1920×1080 resolution and includes 2 million pixels to provide a significantly higher image-quality as compared to those of the SD.

Recently, the video technology has be grown in one step to UHD (Ultra High-Definition (UHD) beyond the above-mentioned Full HD, and the UHD supporting ultra-high image quality and ultra-high resolution has attracted attention as a next generation media environment. The UHD supports 4K (3840×2160) and 8K (7680×4320) resolutions and supports the surround audio of up to 22.2 channels. Such a UHD provides image quality 4 times sharper than the image quality of the 4K UHD standard, and the 8K UHD provides image quality 16 times sharper than the HD.

Meanwhile, when such a UHD Audio-Video (AV) signal is output to an external output device in real time, an AV signal and a control signal containing the information on the AV signal have to be synchronized with each other.

When the AV signal is output without synchronization between the AV signal and the control signal matched with the AV signal, image quality and sound quality may be deteriorated.

DISCLOSURE

Technical Problem

The present invention is to optimize the synchronization between an AV signal and a control signal containing information on the AV signal.

The present invention is to improve the synchronization between an AV signal and a control signal by varying a transmission scheme of the AV signal and the control signal depending on wireless quality states.

Technical Solution

According to an embodiment of the present invention, a video transmitting device may transmit a compressed AV signal and an uncompressed control signal to a video receiving device through mutually different wireless communication standards.

According to the present invention, the video transmitting device may transmit AV signal patterns and control signal patterns to the video receiving device to determine synchronization, when a wireless quality state between the video transmitting device and the video receiving device is superior to a reference quality state.

According to the present invention, the video transmitting device inserts a time stamp into the AV signal and the control signal, when the wireless quality state between the video transmitting device and the video receiving device is inferior to the wireless quality state.

According to the embodiment of the present invention, the video receiving device may receive, from the video transmitting device, a compressed AV signal and an uncompressed control signal according to mutually different wireless communication standards.

According to the present invention, the video receiving device may receive the AV signal patterns and the control signal patterns to determine the synchronization from the video transmitting device, when the wireless quality state between the video transmitting device and the video receiving device is superior to the reference quality state. According to the present invention, the video receiving device may receive an AV signal, into which the time stamp is inserted, and a control signal into which the time stamp is inserted, and synchronize the AV signal with the control signal, when the wireless quality state between the video transmitting device and the video receiving device is inferior to the reference quality state.

Advantageous Effects

According to the embodiment of the present invention, the deterioration of the image quality or the sound quality may be minimized through the optimized synchronization scheme.

According to the embodiment of the present invention, the synchronization schemes may be varied depending on wireless environments, thereby adaptively performing synchronization.

DESCRIPTION OF DRAWINGS

FIGS. 1 to 3 are views illustrating a configuration of a display system, according to an embodiment of the present invention.

FIG. 4 is a ladder diagram illustrating a method for operating a display system, according to an embodiment of the present invention.

FIG. 5 illustrates a procedure of transmitting the AV signal pattern and the control signal pattern to the video receiving device, according to an embodiment of the present invention.

FIGS. 6 and 7 illustrate actual examples of signal patterns, according to the embodiment of the present invention.

FIGS. 8 and 9 are views for comparing characteristics between the AV signal and the control signal.

FIG. 10 is a view for explaining a process of making the synchronization between the AV signal and the control signal using the time stamp according, to an embodiment of the present invention.

MODE FOR INVENTION

Hereinafter, an embodiment of the present invention will be described with reference to drawings. The suffix "module" and "part" for components used in the following description are given or mixed only for the illustrative purpose, and do not have mutually different meanings or roles.

According to the embodiment of the present invention, a video transmitting device, which serves as an intelligent device having a broadcast receiving function and a computer-aid function, is equipped with an Internet function while faithfully performing the broadcast receiving function, and equipped with an easy-to-use interface such as a handwriting input device, a touch screen, or a space remote control. In addition, due to the support of the wired or wireless Internet function, the video transmitting device accesses the Internet and a computer to perform a function such as an e-mail, web-browsing, banking, or game. A standardized general-purpose operating system (OS) may be used for these various functions.

Therefore, the video transmitting device according to the present invention may perform various user-friendly functions since various applications are freely added or deleted on, for example, a general-purpose OS kernel.

FIGS. 1 to 3 are views illustrating a configuration of a display system according to an embodiment of the present invention.

Referring to FIG. 1, a display system 1 according to an embodiment of the present invention includes a video transmitting device 100 and a video receiving device 200.

The video transmitting device 100 may be a device capable of encoding a content image and wirelessly transmitting the encoded content image.

The video receiving device 200 may be a display device capable of wirelessly receiving the encoded content and decoding the received content.

The video transmitting device 100 and the video receiving device 200 may constitute a video wall display system.

In a video wall, having a thin bezel in the display plays an important role in visualizing the content image. For the thin bezel of the display, it is efficient that only the components for the minimum function are provided, and the circuitry or components for the main function are received in a separate device.

The video transmitting device 100 may determine the type of the content image input from the outside and determine the compression ratio of the content image based on the determined type. The compression ratio of the content image may indicate a ratio of compressing the data size of the content image.

The type of the content image may include the type of a still image, the type of a general moving picture, and the type of a game moving picture.

The video transmitting device 100 may compress the content image according to the determined compression ratio, and may transmit the compressed content image to the video receiving device 200 wirelessly.

The video receiving device 200 may recover the compressed content image received from the video transmitting device 100 and display the recovered content image on the display.

FIG. 2 is a block diagram illustrating the detailed configuration of the video transmitting device 100 and the video receiving device 200.

Referring to FIG. 2, the video transmitting device 100 may include a processor 110, a content compressing unit 130, a first wireless communication unit 150, and a memory 170.

The processor 110 may control the overall operation of the video transmitting device 100. The processor 110 may be configured as a system on chip (SoC).

A plurality of processors 110 may be provided.

The processor 110 may determine the compression ratio of an audio or a video input from the outside according to the type of the content image, and may transmit at least one of audio or video to the content compressing unit 130 according to the determined compression ratio.

The content compressing unit 130 may compensate for the dis connection of the content image or wireless communication by changing the compression ratio of the content image according to the wireless quality. The content image may include one or more of audio (Audio) or video (Video).

When the wireless quality is low, the content compressing unit 130 may decrease a data transmission rate (which means that the compression ratio is increased).

When the radio quality is high, the content compressing unit 130 may increase the data transmission rate (which means that the compression ratio is decreased).

The content compressing unit 130 may be referred to as an encoder.

The first wireless communication unit 150 may wirelessly transmit the content image compressed by the content compressing unit 130 to the video receiving device 200.

The memory 170 may store at least one signal pattern used to synchronize the AV signal with a control signal matched to the AV signal.

Referring to FIG. 3, the first wireless communication unit 150 may include a first wireless transmitting unit 151 and a second wireless transmitting unit 153.

The first wireless communication unit 150 may transmit the compressed content image to the second wireless communication unit 210 of the video receiving device 200 through two channels.

Each of the first wireless transmitting unit 151 and the second wireless transmitting unit 153 transmits the compressed content image to the first wireless receiving unit 211 and the second wireless receiving unit 213 of the video receiving device 200.

According to one embodiment, two channels are used to transmit the compressed content image through a channel with more excellent wireless quality, thereby reducing a transmission delay.

According another embodiment, the reason why two channels is to divide and transmit the content image through two channels since the data capacity is large in the case of a content image having a 4K resolution.

Each of the first wireless transmitting unit 151 and the second wireless transmitting unit 153 may include a baseband module for baseband communication and a radio frequency (RF) module for RF communication.

The baseband module may generate low frequency band data, which is not modulated, for the compressed content image and transmit the lower frequency band data to the RF module.

The RF module converts data in a low frequency band into data in a high frequency band according to an RF communication standard, and transmits the data for the converted content image to the video receiving device 200.

The video receiving device 200 may include a second wireless communication unit 210, a content recovering unit 230, and a display 250.

The second wireless communication unit 210 may include a first wireless receiving unit 211 and a second wireless receiving unit 213.

In other words, the second wireless communication unit 210 may also include two channels.

Each of the first wireless receiving unit 211 and the second wireless receiving unit 213 may include a baseband module for baseband communication and an RF module for RF communication.

The RF module may receive data in a high frequency band from the video transmitting device 100 according to the RF (Radio Frequency) communication standard.

The baseband module may convert data in the high frequency band into data in the low frequency band.

The content recovering unit 230 may decode the content image received through the second wireless communication unit 210.

The content recovering unit 230 may recover the compressed content image into a content image having an original size.

The content recovering unit 230 may include as a decoder.

The display 250 may display the recovered content image.

The video receiving device 200 may further include a memory 260. The video receiving device 200 may store information received from the video transmitting device 100 and a program for executing the application.

FIG. 4 is a ladder diagram illustrating a method for operating a display system according to an embodiment of the present invention.

The processor 110 of the video transmitting device 100 may receive a power-on signal (S401).

According to an embodiment, the processor 110 may receive the power-on signal from a remote control for controlling the operation of the video transmitting device 100.

The processor 110 of the video transmitting device 100 determines whether the wireless quality state between the video transmitting device 100 and the video receiving device 200 is superior to the reference quality state (S403)

According to an embodiment, the video receiving device 200 may detect a packet error and may determine the wireless quality state, based on the detected packet error.

For example, when the detected packet error ratio is equal to or greater than a preset ratio, the video receiving device 200 may determine that the wireless quality is inferior to the reference quality state, and when the detected packet error ratio is less than the preset ratio, the video receiving device 200 may determine that the wireless quality is superior to the reference quality state.

According to another embodiment, the video receiving device 200 may determine the state of the wireless quality using the data reception sensitivity.

For example, when the data reception sensitivity is equal to or higher than specific sensitivity, the video receiving device 200 may determine that the wireless quality to be superior to the reference quality state. When the data reception sensitivity is less than the specific sensitivity, the video receiving device 200 may determine that the wireless quality to be inferior to the reference quality state.

According to another embodiment, the video receiving device 200 may determine the wireless quality state by using the intensity of an RF signal.

For example, when the intensity of the RF signal is equal to or higher than a preset intensity, the video receiving device 200 may determine the wireless quality to be superior to the reference quality state. When the intensity of the RF signal is less than the preset intensity, the video receiving device 200 may determine the wireless quality to be inferior to the wireless quality state.

Meanwhile, the video receiving device 200 may feedback the information on the wireless quality state to the video transmitting device 100.

Although the above-description has been made in that the video receiving device 200 determines the wireless quality state, the video transmitting device 100 may also determine the wireless quality state using the above-described method.

The processor 110 of the video transmitting device 100 acquires N pattern frames each including an Audio-Video (AV) signal pattern and a control signal pattern, when the wireless quality state is superior to the reference quality state (S405).

One pattern frame may include one AV signal and one control signal.

Each of the N AV signal patterns may correspond to each of the N control signal patterns.

Each AV signal pattern and each control signal pattern may be a test pattern transmitted for synchronization between the AV signal and the control signal before actually transmitting the AV signal and the control signal.

Examples of an AV signal pattern and a control signal pattern will be described with reference to FIGS. 5 to 7.

FIG. 5 illustrates a procedure of transmitting the AV signal pattern and the control signal pattern to the video receiving device according to an embodiment of the present invention, and FIGS. 6 and 7 illustrate actual examples of signal patterns.

In FIG. 5, four AV signal patterns 501 to 509 and four control signal patterns 511 to 519 corresponding to four frames are illustrated.

Any one of the four AV signal patterns 501 to 509 may be matched to any one of the four control signal patterns 511 to 519.

The video receiving device 200 may determine a matching pattern through comparison between the AV signal pattern and the control signal pattern.

FIGS. 6 and 7 illustrate examples of the AV signal patterns and the control signal pattern.

Referring to FIG. 6, a first signal pattern 600 may include five white boxes 601 to 609.

The first signal pattern 600 may have a rectangular shape and may include the five white boxes 601 to 609. Each of the five white boxes 601 to 609 has a digital data value of 1 and the area excluding the five white boxes 601 to 609 may have a digital data value of 0.

The first AV signal pattern 501 of the four AV signal patterns 501 to 509 illustrated in FIG. 5 may have the same signal pattern as that of the second control signal pattern 513 of the four control signal patterns 511 to 519.

That is, the AV signal pattern and the control signal pattern matching to the AV signal pattern may have the same signal pattern.

Referring to FIG. 7, a second signal pattern 700 is illustrated. The second signal pattern 700 has a rectangular shape and may include three white boxes 701 to 705.

The three white boxes 701 to 705 have a digital data value of 1 and the remaining areas excluding the three white boxes 701 to 705 may have a digital data value of 0.

The first control signal pattern 511 the four AV signal patterns 501 to 509 illustrated in FIG. 5 may have the same signal pattern as that of the first control signal pattern 511 of the four control signal patterns 511 to 519.

That is, the AV signal pattern and the control signal pattern matching the AV signal pattern may have the same signal pattern.

FIG. 4 will be again described.

In one embodiment, the N AV signal patterns and the N control signal patterns may be stored in the memory 170 in advance.

That is, the signal patterns illustrated in FIGS. 6 and 7 may be stored in advance in the memory 170.

The processor 110 may extract the N AV signal patterns and the N control signal patterns from the memory 170.

The processor 110 of the video transmitting device 100 sequentially transmits N pattern frames to the second wireless communication unit 210 of the video receiving device 200 through the first wireless communication unit 150 (S407).

The processor 270 of the video receiving device 200 matches N AV signal patterns and N control signal patterns from the received N pattern frames (S409).

In one embodiment, the processor 270 may separate the N AV signal patterns and the N control signal patterns from N pattern frames.

The processor 270 may compare the N AV signal patterns with the N control signal patterns, respectively.

The processor 270 may match the AV signal pattern with the control signal pattern, which have the same signal pattern, according to the comparison result.

For example, when the first AV signal pattern 501 and the second control signal pattern 513 illustrated in FIG. 5 corresponds to the first signal pattern 600 illustrated in FIG. 6, the processor 270 may match the first AV signal pattern 501 with the second control signal pattern 513.

When the second AV signal pattern 503 and the first control signal pattern 511 illustrated in FIG. 5 correspond to the second signal pattern 700 illustrated in FIG. 7, the processor 270 may match the second AV signal pattern 503 with the first control signal pattern 511.

In one embodiment, the processor 270 may recognize the shape of the signal pattern using a sequential projection scheme.

The processor 270 may match the AV signal pattern and the control signal pattern, which have the same shape in the recognized signal pattern, with each other.

The processor 270 of the video receiving device 200 acquires the start pattern to be reproduced first among the AV signal patterns (S411).

In one embodiment, the processor 270 may acquire the start pattern to be reproduced first among the AV signal patterns, based on the reproduction order information included in the control signals.

The processor 270 of the video receiving device 200 synchronizes the AV signal patterns using the acquired start pattern (S413).

In one embodiment, the processor 270 may calculate the reproduction time difference between the following AV signal patterns, based on the start pattern.

For example, the processor 270 may calculate the reproduction time difference between AV signal patterns by dividing the total reproduction time of the AV signal patterns by the number of the AV signal patterns.

The processor 270 may adjust reproduction timing of each of the AV signal patterns and each of the control signal patterns matched with the AV signal patterns, at intervals of the reproduction time difference between the calculated AV signal patterns.

Through such a process, the reproduction synchronization between the AV signal and the control signal matched with the AV signal may be made.

After the synchronization of the AV signal patterns is completed, the processor 270 of the video receiving device 200 transmits a signal transmission request to the video transmitting device 100 (S415).

That is, when the reproduction timing (or the reproduction synchronization) between the AV signal patterns and the control signal patterns is matched, the processor 270 of the video receiving device 200 may determine that preparation for synchronization (or test) is completed.

The signal transmission request may include information indicating that synchronization between the AV signal patterns and the control signal patterns is completed.

Upon receiving the signal transmission request, the processor 110 of the video transmitting device 100 transmits the AV signal and the control signal to the video receiving device 200 through a separate channel (S417).

The processor 110 may transmit the AV signal to the first wireless receiving unit 211 of the video receiving device 200 through the first wireless transmitting unit 151, and may transmit the control signal to the second wireless receiving unit 213 of the video receiving device 200 through the second wireless transmitting unit 153.

The AV signal may be transmitted to the video receiving device 200 through the frequency band of 60 GHz and the control signal may be transmitted to the video receiving device 200 through the frequency band of 2.4 GHz or 5 GHz.

To this end, the first wireless transmitter 151 and the second wireless transmitter 153 of the video transmitting device 100 may use wireless communication modules having different communication standards.

The AV signal may be compressed at a specific compression ratio through the content compressing unit 133 and transmitted to the first wireless receiving unit 211 of the video receiving device 200 through the first wireless transmitting unit 151.

Meanwhile, the control signal may be transmitted to the second wireless communication unit 210 of the video receiving device 200 through the second wireless transmitting unit 153 without compression.

The control signal contains image quality information for a relevant frame. If the control signal is compressed and transmitted, the image quality information may be damaged, and thus image quality deterioration may occur when the AV signal is reproduced.

Therefore, unlike the AV signal, the control signal is uncompressed and transmitted to prevent data loss.

As described above, the AV signal and the control signal may be transmitted to different communication modules due to the difference in the information contained therein.

FIGS. 8 and 9 are views for comparing characteristics between the AV signal and the control signal.

The AV signal and the control signal contain information on one frame (one still image).

The AV signal contains the video and audio of the frame, and the control signal contains the image quality information of the frame.

Referring to FIG. 8, the AV signal has a resolution of 4K (3840×2160) or 8K (7680×4320), and may be transmitted to the video receiving device 200 in the unit of frame.

The control signal may be transmitted to the video receiving device 200 in the unit of frame.

Referring to FIG. 9, since the AV signal is a video signal having a resolution of 4K or 8K, a data amount is much larger than that of the control signal.

Accordingly, the AV signal may be compressed and transmitted to the video receiving device 200, and the control signal may be uncompressed to be transmitted to the video receiving device 200 since a data amount is small.

Since the AV signal is compressed and transmitted, the loss of data may partially occur during the recovering process.

Meanwhile, since the control signal is uncompressed and transmitted, there is no loss of data. The control signal includes the image quality information of the AV signal. Accordingly, if data loss occurs in the control signal, image quality deterioration may occur.

In both of the AV signal and the control signal, the period of wireless transmission may be randomly set.

Meanwhile, the AV signal includes a video signal and an audio signal of the content.

The control signal may include image quality information such as the brightness of the frame and the resolution of the frame.

The control signal may be an IR signal such as power on/off for controlling power operation of the video receiving device 200

FIG. 4 will be described again.

The processor 270 of the video receiving device 200 matches the AV signal with the control signal for each frame to reproduce the AV signal (S419).

The frame may be a still image. An image having predetermined reproduction duration may be reproduced, as a plurality of frames are sequentially output.

One frame may correspond to the AV signal and the control signal matched with the AV signal.

Each of the AV signal and the control signal may include the reproduction order of frames.

The processor 270 may match the AV signal with the control signal through comparison of each reproduction order.

The processor 270 may apply the image quality information included in the control signal to the AV signal to reproduce the AV signal in the unit of the frame.

Meanwhile, if it is determined in step S403 that the wireless quality state is inferior to the reference quality state, the processor 110 of the video transmitting device 100 generates a time stamp for each frame (S421) and inserts the generated time stamp into the AV signal and the control signal matched with the AV signal (S423).

In one embodiment, when the wireless quality state between the video transmitting device 100 and the video receiving device 200 is inferior to the reference quality state, the processor 110 may individually insert the time stamp into the AV signal and the control signal corresponding to the AV signal, since the synchronization between the AV signal and the control signal may not be made.

In one embodiment, the processor 110 may insert the same time stamp into the AV signal corresponding to each frame, which is a reproduction unit, and the control signal matched with the AV signal.

The processor 110 of the video transmitting device 100 transmits the AV signals and the control signals, into which the time stamp is inserted, to the video receiving device 200 through separate channels (S425).

The processor 270 of the video receiving device 200 reproduces the AV signal by matching the AV signal and the control signal corresponding to the AV signal for each frame using the time stamp, thereby reproducing the AV signal (S427).

The process of making the synchronization between the AV signal and the control signal using the time stamp will be described with reference to FIG. 10 later.

FIG. 10 is a view for explaining a process of making the synchronization between the AV signal and the control signal using the time stamp according to an embodiment of the present invention.

Hereinafter, the embodiment of FIG. 10 will be described by making reference to the description of the embodiment of FIGS. 2 and 3.

Referring to FIG. 10, the content compressing unit 130 may include an encoding unit 131 and a packetizing unit 133.

The encoding unit 131 may encode the AV signal.

The processor 110 may generate a time stamp for each frame and transmit the generated time stamp to the packetizing unit 133.

In this case, the time stamp may include the reproduction time point of the relevant frame.

The packetizing unit 133 may transmit an AV packet, which is obtained by inserting the time stamp into the AV signal, to the first wireless transmitting unit 151.

The processor 110 may insert the same time stamp inserted into the AV signal into the control signal matched with the AV signal.

The processor 110 may transmit a control packet, which is obtained by inserting the time stamp into the control, to the second wireless transmitting unit 153.

The first wireless transmitting unit 151 transmits the AV packet to the first wireless receiving unit 211 of the video receiving device 200, and the second wireless transmitting unit 153 transmits the control packet to the second wireless receiving unit 213 of the video receiving device 200.

The content recovering unit 230 may include a packet parser 231 and a decoding unit 233.

The packet parser 231 may parse the AV packet, and the decoding unit 233 may decode the parsed AV packet.

The processor 270 may compare the time stamp obtained from the decoded AV packet and the time stamp obtained from the control packet. If the time stamps are matched with each other, the processor 270 the AV signal with the control signal.

Thereafter, the processor 270 may reproduce the AV signal using the control signal at the time stamp.

According to an embodiment of the present invention, the above-described method may be implemented with codes readable by a processor in a medium having program. The medium having the program is, for example, a read only memory, a random access memory, a CD-ROM, a magnetic tape, a floppy disk, or an optical data storage.

The video transmitting device described above is not limited to components and methods of the above-described embodiments, and the entire portion or a portion of the embodiments are selectively combined such that the embodiments have variations.

The invention claimed is:

1. A video transmitting device, comprising:
    a wireless transmitter including a first wireless transmitter and a second wireless transmitter and configured to wirelessly transmit to a video receiving device;
    an encoder configured to compress an Audio-Video (AV) signal; and
    a processor configured to:
    control the first wireless transmitter to transmit the compressed AV signal to the video receiving device in a first frequency band; and
    control the second wireless transmitter to transmit an uncompressed control signal to the video receiving device in a second frequency band lower than the first frequency band, wherein the uncompressed control signal includes information regarding the compressed AV signal.

2. The video transmitting device of claim 1, wherein the processor is further configured to:

transmit, to the video receiving device, a plurality of AV signal patterns and a plurality of control signal patterns, before controlling the first wireless transmitter to transmit the compressed AV signal and controlling the second wireless transmitter to transmit the uncompressed control signal, when a wireless quality state between the video transmitting device and the video receiving device is superior to a reference quality state.

3. The video transmitting device of claim 2, wherein the plurality of AV signal patterns and the plurality of control signal patterns are used to synchronize the compressed AV signal with the uncompressed control signal.

4. The video transmitting device of claim 3, wherein the processor is further configured to:
receive, from the video receiving device, a signal transmission request representing that reproduction synchronization between the plurality of AV signal patterns and the plurality of control signal patterns is completed; and
control the first wireless transmitter to transmit the compressed AV signal and control the second wireless transmitter to transmit the uncompressed control signal to the video receiving device in response to the received signal transmission request.

5. The video transmitting device of claim 2, wherein the processor is further configured to:
insert a time stamp into each of the compressed AV signal and the uncompressed control signal, when the wireless quality state is inferior to the reference quality state;
control the first wireless transmitter to transmit, to the video receiving device, the compressed AV signal, into which the time stamp is inserted; and
control the second wireless transmitter to transmit, to the video receiving device, the uncompressed control signal, into which the time stamp is inserted.

6. The video transmitting device of claim 2, wherein the first frequency band is a 60 GHz frequency band, and the second frequency band is a 2.4 GHz frequency band or a 5 GHz frequency band.

7. The video transmitting device of claim 2, further comprising:
a memory to store the plurality of AV signal patterns and the plurality of control signal patterns.

8. A video receiving device, comprising:
a wireless receiver including a first wireless receiver and a second wireless receiver and configured to wirelessly receive from a video transmitting device;
a decoder configured to recover a compressed AV signal received through the wireless receiver; and
a processor configured to:
control the first wireless receiver to receive the compressed AV signal from the video transmitting device in a first frequency band; and
control the second wireless receiver to receive an uncompressed control signal from the video transmitting device in a second frequency band lower than the first frequency band, wherein the uncompressed control signal includes information regarding the compressed AV signal.

9. The video transmitting device of claim 8, wherein the processor is further configured to:
receive, from the video transmitting device, a plurality of AV signal patterns and a plurality of control signal patterns, before the compressed AV signal and the uncompressed control signal are received, when a wireless quality state between the video transmitting device and the video receiving device is superior to a reference quality state.

10. The video receiving device of claim 9, wherein the plurality of AV signal patterns and the plurality of control signal patterns are used to synchronize the compressed A V signal with the uncompressed control signal.

11. The video receiving device of claim 10, wherein the processor is further configured to:
compare the plurality of AV signal patterns with the plurality of control signal patterns, respectively;
match an AV signal pattern of the plurality of AV signal patterns and a control signal pattern of the plurality of control signal patterns having a same signal pattern together, according to a comparison result; and
synchronize the AV signal pattern and the control signal pattern matched with the AV signal pattern according to a matching result.

12. The video receiving device of claim 11, wherein the processor is further configured to:
transmit, to the video transmitting device, a signal transmission request representing that reproduction synchronization between the plurality of AV signal patterns and the plurality of control signal patterns is completed; and
receive the compressed AV signal and the uncompressed control signal from the video transmitting device in response to the transmitted signal transmission request.

13. The video receiving device of claim 9, wherein the processor is further configured to:
when the wireless quality state is inferior to the reference quality state:
control the first wireless transmitter to receive, from the video transmitting device, the compressed AV signal including a time stamp; and
control the second wireless transmitter to receive, from the video transmitting device, the uncompressed control signal, into which including the time stamp.

14. The video receiving device of claim 13, wherein the processor is further configured to:
synchronize the compressed AV signal with the uncompressed control signal by using the time stamp.

15. The video receiving device of claim 8, wherein the first frequency band is a 60 GHz frequency band, and the second frequency band is a 2.4 GHz frequency band or a 5 GHz frequency band.

* * * * *